(12) United States Patent
Rogers et al.

(10) Patent No.: US 6,217,203 B1
(45) Date of Patent: Apr. 17, 2001

(54) RESEALABLE LIGHT CAPSULE FOR A TAIL LIGHT

(75) Inventors: Thomas W. Rogers, Kewaskum; Edgar C. Paffrath, Milwaukee, both of WI (US)

(73) Assignee: Wesbar Corporation, West Bend, WI (US)

( * ) Notice: Subject to any disclaimer, the term of this patent is extended or adjusted under 35 U.S.C. 154(b) by 0 days.

(21) Appl. No.: 09/388,418

(22) Filed: Sep. 1, 1999

(51) Int. Cl.$^7$ .................................................. F21W 101/14
(52) U.S. Cl. ........................ 362/548; 362/546; 362/541
(58) Field of Search .................................. 362/546, 548, 362/540, 541, 505

(56) References Cited

U.S. PATENT DOCUMENTS

| | | |
|---|---|---|
| D. 413,687 | 9/1999 | Darby ........................................ D26/28 |
| D. 417,298 | 11/1999 | Paffrath et al. ........................... D26/28 |
| 1,070,028 | 8/1913 | Fortmann . |
| 1,125,089 | 1/1915 | Godley . |
| 1,279,055 | 9/1918 | Wescott . |
| 1,387,846 | 8/1921 | Gabel . |
| 1,413,104 | 4/1922 | Day . |
| 1,487,827 | 3/1924 | Weiss . |
| 1,513,300 | 10/1924 | Vose . |
| 1,538,175 | 5/1925 | Deery . |
| 1,580,218 | 4/1926 | Robinson . |
| 1,637,375 | 8/1927 | Galamb . |
| 1,914,009 | 6/1933 | Currie . |
| 2,102,029 | 12/1937 | Putterman ............................. 240/8.3 |
| 2,152,789 | 4/1939 | Butler ..................................... 177/329 |
| 2,469,274 | 5/1949 | Rein ....................................... 200/167 |
| 2,637,804 | 5/1953 | Hollins ................................. 240/41.5 |
| 2,738,414 | 3/1956 | Davis et al. ......................... 240/8.22 |
| 2,999,923 | 9/1961 | Schmidt ................................. 240/11.4 |
| 3,032,646 | 5/1962 | Chieger .................................. 240/8.2 |
| 3,106,349 | 10/1963 | Bloodgood, Jr. ...................... 240/8.2 |
| 3,275,816 | 9/1966 | Brunger .............................. 240/8.22 |
| 3,445,645 | 5/1969 | Newman ................................. 240/8.2 |
| 3,530,287 * | 9/1970 | Husby .................................... 362/226 |
| 3,705,301 * | 12/1972 | Franklin et al. ................... 362/223 X |
| 3,831,964 | 8/1974 | Campbell et al. ...................... 280/81 |
| 3,858,039 | 12/1974 | Moore ..................................... 240/8.3 |
| 4,214,683 | 7/1980 | Wills et al. ........................... 224/42.2 |
| 4,281,367 | 7/1981 | Moore et al. ........................... 362/96 |
| 4,290,098 | 9/1981 | Pierson ................................. 362/267 |
| 4,293,847 | 10/1981 | McCarty ............................... 340/332 |
| 4,390,031 | 6/1983 | Gorick et al. ........................ 362/267 |
| 4,445,163 | 4/1984 | Ziaylek, Jr. .......................... 362/287 |
| 4,506,314 | 3/1985 | Moore ................................... 362/267 |
| 4,617,617 | 10/1986 | Cunningham et al. .............. 362/267 |
| 4,930,050 | 5/1990 | Poizner .................................. 362/61 |
| 5,060,121 * | 10/1991 | Cunningham et al. .......... 362/548 X |
| 5,156,455 | 10/1992 | Kuo ...................................... 362/83.2 |
| 5,335,155 | 8/1994 | Hanson et al. ....................... 362/267 |
| 5,529,535 * | 6/1996 | Forish ............................... 362/548 X |

* cited by examiner

*Primary Examiner*—Laura K. Tso
(74) *Attorney, Agent, or Firm*—Andrus, Sceales, Starke & Sawall

(57) ABSTRACT

A resealable light capsule for use in a tail light assembly utilized with boat trailers is provided. The capsule is mounted within the outer housing of the tail light assembly and includes a base, a lighting mechanism secured to the base, and a transparent, dome-like casing that is selectively engageable with the base. The casing is held in position on the base by a latching mechanism comprised of a number of locking clips extending outwardly from the base that releasably engage a locking flange located on the casing. The peripheral edge of the casing is sealed to the base by an O-ring seal that is positioned in a groove in the base and engages the inner surface of the casing adjacent the peripheral edge. The lighting mechanism disposed within the capsule can be selectively connected with the electrical system of a vehicle through the use of a plug, connected to the vehicle electrical system, and a set of plug receptacles, disposed in the base and connected to the lighting mechanism. Due to the resealable construction of the capsule, if any part of the capsule becomes inoperative, that part can be replaced without having to replace the entire capsule.

16 Claims, 3 Drawing Sheets

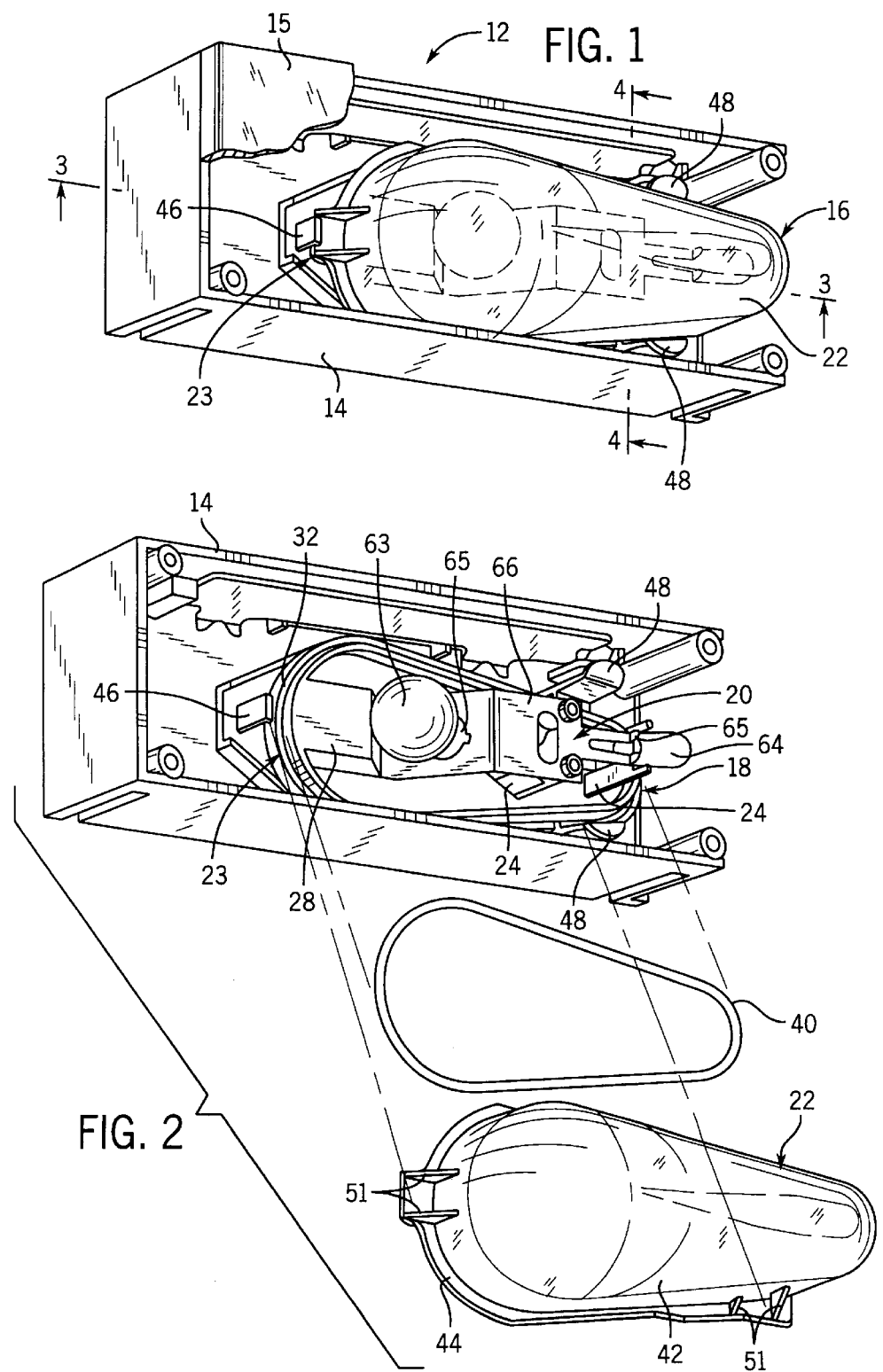

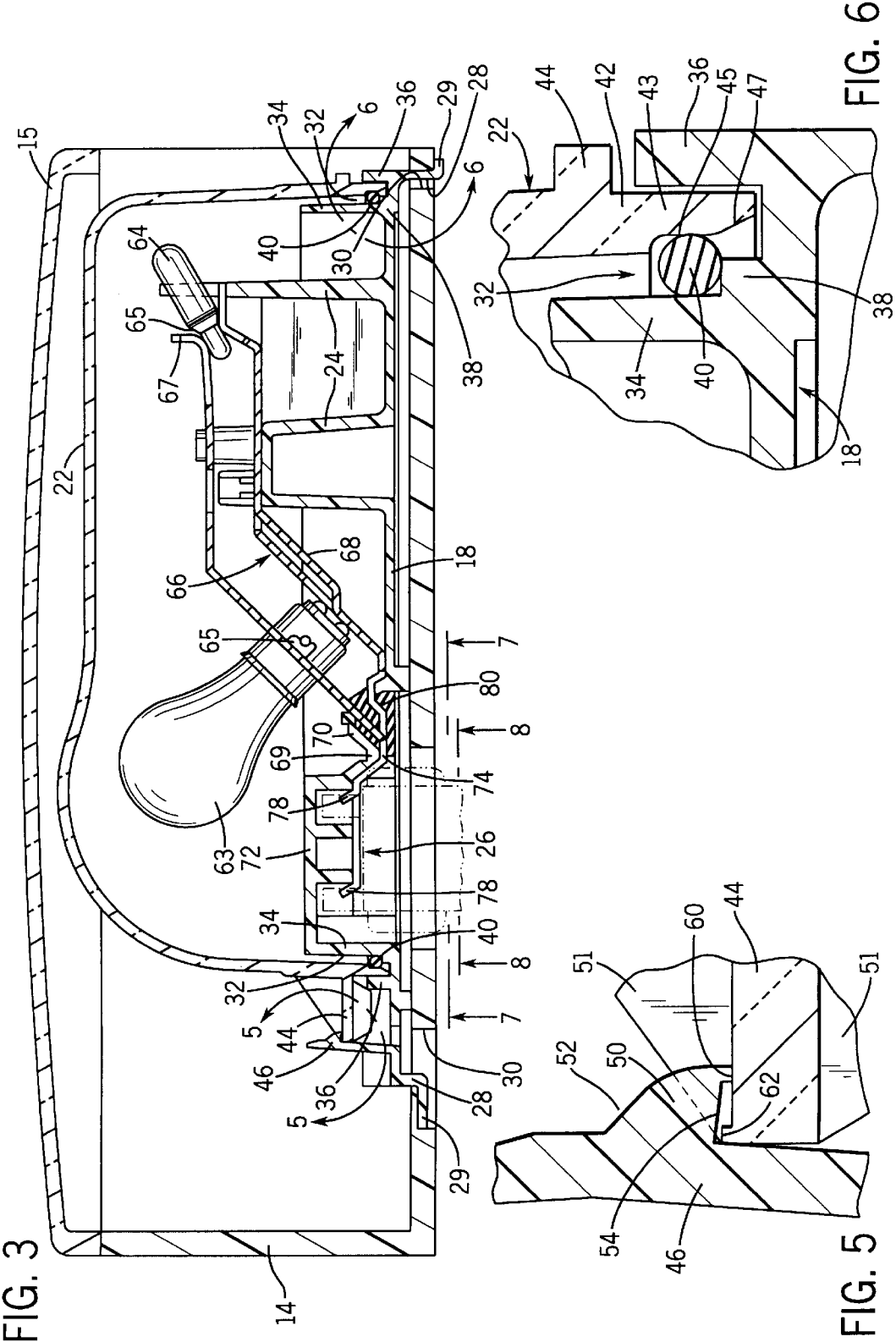

RESEALABLE LIGHT CAPSULE FOR A TAIL LIGHT

FIELD OF THE INVENTION

The present invention relates to tail lights used on boat trailers and recreational vehicles. More specifically, the present invention relates to resealable light capsules contained within the aforementioned tail lights.

BACKGROUND OF THE INVENTION

Sealed light capsules have been used in connection with signaling lights, namely tail lights on boat trailers, to enable the tail light to be submerged in water during boat launching without damaging the tail light or its components. U.S. Pat. No. 5,060,121 discloses a tail light assembly for a boat trailer including a sealed capsule. As disclosed in that patent, the tail light includes an open-ended housing having a rear wall which is secured in a generally vertical manner to the boat trailer and a translucent lens that encloses the open end of the housing. Mounted within the housing is a sealed capsule consisting of a generally flat base which is secured to the rear wall of the housing and a dome-shaped cover or casing. A lighting mechanism including one or more light bulbs and sockets for the bulbs are located within the capsule and the peripheral edge of the casing is permanently secured or sealed to the base by ultrasonic welding.

As described in the aforementioned patent, the electrical conductors which are connected to the lighting mechanism within the capsule extend through an opening in the base and terminate in a well or depression formed in the rear surface of the base. Lead wires are attached to the conductors in the well through sleeve connectors and the entire well is filled with a thermosetting resin that upon curing hardens and forms a rigid seal around the electrical connections, as well as enclosing the opening in the base through which the conductors extend.

However, the use of the sealed light capsule, as described in the above patent, does have certain shortcomings. First, due to the permanent seal formed around the electrical connections, any time the light capsule fails for any reason, the lead wires must be disconnected from the vehicle's electrical system and the entire capsule removed and replaced. Disconnecting the lead wires from the electrical system of the vehicle can require considerable time and effort as the electrical system is normally located inside the vehicle or trailer. In some cases, disconnecting the lead wires can only be accomplished by removing the entire tail light assembly from the vehicle.

Furthermore, in situations where the light capsule becomes inoperable only due to the failure of a light bulb contained within the capsule, again, the entire capsule must be replaced. Because of the permanently sealed construction of the light capsule, there is no way to access the interior of the light capsule and remove only the defective light bulb for replacement without also breaking the casing and rendering the entire light capsule unusable.

Lastly, when applying the thermosetting resin to the plug well after connection of the lead wires to the conductors, the head pressure created by the weight of the resin placed in the well can cause some of the resin to leak through the conductor openings before the resin can cure. Any resin located within the capsule can create problems with the lighting mechanism by interfering with either the sockets containing the light bulbs or the electric circuit created by the conductors.

SUMMARY OF THE INVENTION

The invention relates to a tail light for a vehicle and in particular to a submersible tail light for a boat trailer and containing a sealed light capsule whose construction allows for the replacement of individual components within the capsule without having to dispose of the entire capsule.

The tail light of the invention includes a generally open-ended housing having a rear wall that is secured in vertical orientation to the boat trailer, or other vehicle, and a translucent lens that encloses the open end of the housing. Mounted within the housing is a sealed capsule that contains the lighting mechanism. The capsule is provided with a generally flat base which is removably secured to the rear wall of the housing and a generally dome-shaped transparent cover or casing, preferably formed of plastic material, is mounted in sealed relation to the base. The lighting mechanism which is enclosed within the casing includes a tail light bulb and a side marker bulb, both of which are mounted within sockets that are secured to the forward surface of the base.

As a feature of the invention, a latching mechanism is employed to removably secure the peripheral edge of the capsule casing to the base. The latching mechanism includes a flange that extends laterally around the bottom edge portion of the casing and is adapted to be engaged by a plurality of flexible locking clips that extend upwardly from, and are spaced around, the periphery of the base to thereby removably secure the casing on the base. When the casing is pressed into position on the base, the peripheral edge of the casing will flex the locking clips outwardly, enabling a locking stub that projects from each clip to engage the upper surface of the flange on the casing, to thereby hold the casing in place on the base. Each of the locking clips can be manually flexed outwardly to release the latching mechanism and enable the casing to be removed from the base.

To seal the peripheral edge of the casing to the base of the capsule, an O-ring seal is seated on a ledge or shoulder in a groove formed in the base and is adapted to engage the inner wall of the casing as the casing is placed on the base. The inner surface bordering the peripheral edge of the casing is designed to engage and compress the seal as the peripheral edge of the casing is inserted into the groove, thereby providing a positive seal between the casing and the base to prevent water or moisture from entering the capsule.

The invention also provides an improved construction for connecting the lighting mechanism contained within the capsule to the electrical system of the boat trailer. In this regard, the electrical conductors that are connected to the lighting mechanism in the capsule extend in sealed relation through an opening in the capsule base and the ends of the conductors are mounted in cup-shaped receptacles located in a well or depression in the rear surface of the base. The electrical system of the vehicle includes a plug having a series of prongs that are removably received in corresponding receptacles, thus completing the electrical circuit between the lighting mechanism in the capsule and the electrical system of the vehicle.

The invention provides a sealed light capsule having a casing that is selectively removably from the capsule base, thus allowing for easy replacement of the light bulb and other individual components contained within the capsule. Further, the casing of the capsule can be readily attached to the base by the latching mechanism without the need of any auxiliary fasteners, such as screws, or the like.

The invention also provides a waterproof seal between the peripheral edge of the casing and the base, thus preventing moisture or other foreign substances from entering the light capsule. As the O-ring seal is located in a groove in the base, the seal is accurately positioned relative to the casing and base, even though the base is located in a generally vertical position.

The invention also provides a convenient manner of connecting the electrical system of the boat trailer to the lighting mechanism of the tail light. The plug connected to the lead wires of the electrical system of the trailer can be conveniently connected and disconnected from the receptacles that are located in the base of the capsule.

BRIEF DESCRIPTION OF THE SEVERAL VIEWS OF THE DRAWING

In the drawings:

FIG. 1 is an isometric view of the replaceable light capsule of the present invention contained within a bracket used in a tail light assembly;

FIG. 2 is an exploded view of the replaceable light capsule of FIG. 1;

FIG. 3 is a cross-sectional view along line 3—3 of FIG. 1;

FIG. 5 is a cross-sectional view along line 5—5 of FIG. 3;

FIG. 6 is a cross-sectional view along line 6—6 of FIG. 3;

DETAILED DESCRIPTION OF THE INVENTION

Figure 11:
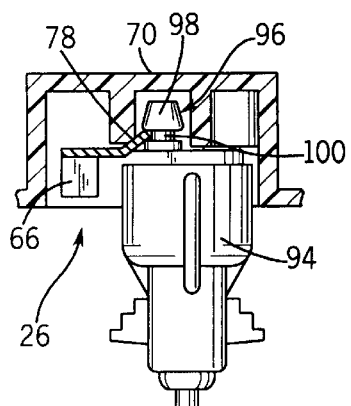
FIG. 11 is a cross-sectional view along line 11—11 of FIG. 7.

FIG. 1 illustrates a tail light assembly 12, including a housing 14 containing a light capsule 16 constructed according the present invention. When fully assembled, the tail light assembly 12 includes a translucent lens 15 covering the open end and side of housing 14 and enclosing the light capsule 16. The housing 14, and lens 15 can be similar in construction to the corresponding elements found in U.S. Pat. No. 5,060,121. The assembly 12 is then electrically connected to the electrical system of a vehicle to deliver the proper light signals when mounted to an exterior surface of a boat trailer or other vehicle in the manner disclosed in U.S. Pat. No. 5,060,121.

Referring now to FIGS. 2–6, the light capsule 16 is generally comprised of a base 18, a lighting mechanism 20 affixed to base 18, and a dome-like transparent casing 22, removably secured to base 18 and enclosing the lighting mechanism 20.

The base 18 is formed of a rigid, plastic material that is essentially electrically non-conductive. The base 18 is also generally planar, but includes a set of bosses 24 or projections which extend forwardly from the base 18 and onto which is attached the lighting mechanism 20. The base 18 further includes a well or depression 26 spaced from the bosses 24, and also projecting forwardly from the base 18. The well 26 facilitates the connection of the lighting mechanism 20 to the electrical system of the vehicle in a manner that will be described herein.

The light capsule 16 is secured within the housing 14 by a pair of tongues 27, 28 extending from the front and rear of the base 18, respectively, as shown in FIG. 3. The tongues 27, 28 each include an offset lip 29 that engages an opening 30 located in the rear wall of housing 14 to securely hold the capsule 16 within the housing 14.

To aid in properly positioning the casing 22 of capsule 16 on the base 18, the base 18 includes a peripheral groove 32 bordered by an inner wall 34 and an outer wall 36, as shown in FIGS. 2 and 6. The inner wall 34 extends beyond outer wall 36 and aids in guiding the casing 22 onto the base 18 and protecting the lighting mechanism 20 from damage from contact with the casing 22 as it is placed onto the base 18. Also included within the positioning groove 32 is an annular shoulder or ledge 38 that is spaced from the base of the inner wall 34.

Figure 4:
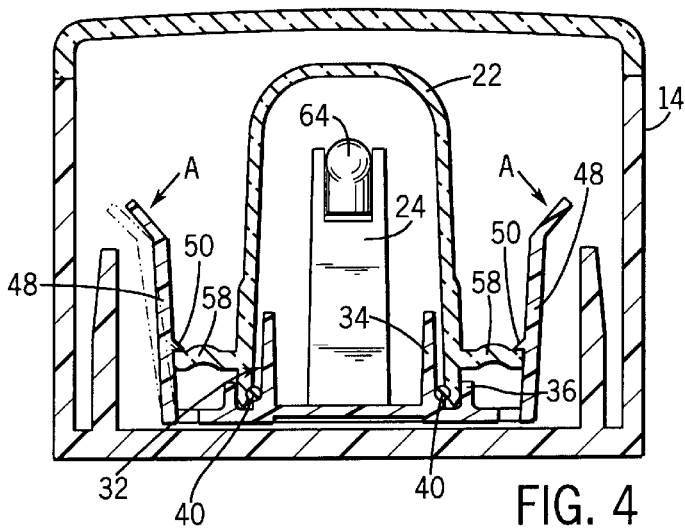
FIG. 4 is a cross-sectional view along line 4—4 of FIG. 1.

To prevent water or other substances from leaking into capsule 16 and interfering with the operation of the lighting mechanism 20, an O-ring 40, preferably made of a water-impervious, resilient material, is seated on the shoulder 38 within the groove 32, as shown in FIGS. 3 and 4. The positioning of the O-ring 40 within the groove 32 allows a seal to be created and maintained between the base 18 and the casing 22 regardless of any thermal expansion, plastic creep, or other limited, movement of the casing 22 with respect to the base 18.

Referring again to FIGS. 2 and 6, the seal between the casing 22 and the base 18 is, in part, maintained by the shape of the casing 22. The casing 22 is provided with a pair of side walls 42 that are convex in shape. The convex shape of side walls 42 increases the strength of the casing 22 and urges the side walls 42 into engagement with the O-ring 40.

Also, the side walls 42 include tapered edges 43 that further assist in maintaining the seal. As best seen in FIG. 6, each edge 43 has an upper, flat portion 45 and a lower, angled portion 47. The angled portion 47 initially contacts the O-ring 40 as the casing 22 is placed on the base 18 and further movement of the casing toward the base causes the flat portion 45 to engage and compress the O-ring 40. Upper portion 45 is of sufficient length to allow the casing 22 to move relative to the base 18 without compromising the seal between the O-ring 40 and casing 22.

To reliably secure the casing 22 on the base 18, a latching mechanism 23 is provided for the capsule 16. Looking at FIGS. 3–6, the latching mechanism 23 includes a peripheral, outwardly extending flange 44 that encircles the lower edge of casing 22. As the casing 22 is pressed down into engagement with the base 18, the flange 44 engages a flexible front locking clip 46 and a pair of flexible rear locking clips 48. Each of the front and rear locking clips 46, 48 extends upwardly from the base 18 and includes a locking stub 50 that extends inwardly and downwardly towards the base 18. In operation, as the casing 22 is pressed down upon the base 18, the flange 44 contacts an inclined surface 52 on each stub 50. This contact forces each locking clip 46, 48 to deflect outwardly, and allows the casing 22 to slide into engagement with the O-ring 40. Upon engagement of the casing 22 with the O-ring 40, the flange 44 slides off of cam surface 52 and beneath each of the stubs 50 on the clips 46, 48, thus allowing the clips 46, 48 to return to their original positions and positioning a flat retaining surface 54 located on stub 50 below cam surface 52 above the locking flange 44. In this arrangement, a three-point latching mechanism 23 is formed to hold the casing 22 on the base 18. prevent damage from excessive stress to the flange 44, a pair of support ribs 51 are mounted on flange 44 on either side of the attachment point of each clip 46, 48, as shown in FIGS. 3 and 5. The ribs 51 extend both above and below the flange 44 to provide additional support for the flange 44 at the high stress attachment points.

To disengage the latching mechanism 23 described above, the casing 22 may be released from engagement over the base 18 by utilizing either of two releasing mechanisms. First, a pair of manual release arms or extensions 56, integrally formed with, and extending forwardly from, each of the rear locking clips 48, as seen in FIG. 4, can be flexed outwardly to disengage the rear clips 48 from the flange 44. Second, the casing 22 can be removed by utilizing a pair of indentations 58 located adjacent each rear locking clip 48 on the flange 44.

In using the manual release extensions 56, pressure is applied by a user's fingers to the extensions 56 in the direction shown in FIG. 4 by the arrows A to displace the rear locking clips 48 and stubs 50 outwardly from their respective positions over the flange 44. In this manner, the flat surface 54 of each stub 50 slides outwardly from its retaining position over the flange 44. Then, the flange 44 may be lifted upwardly past the locking stubs 50, disengaging the casing 22 from the base 18.

Alternatively, a screwdriver (not shown) may be inserted successively beneath each of the indentations 58 to mechanically effect the displacement of the rear locking clips 48 and stubs 50 from above the flange 44. In this method, to remove the casing 22, after insertion of the screwdriver into the indentation 58, upward pressure exerted on the indentation in 58 via the screwdriver flexes clips 48 outwardly and urges the flange 44 past the stubs 50 on the clips 48 using a simple lever-type action.

In order to prevent inadvertent releasing of the casing 22, the front clip 46 includes a downwardly extending lip 60 on the retaining surface 54 of the stub 50, as shown in FIG. 5. The lip 60, when the clip 46 is in the closed position over flange 44, can engage a complementary lip 62 extending upwardly from the flange 44 to prevent the front clip 46 from releasing the flange 44. The lips 60 and 62 are very small, being about 0.005 inches in height, and serve only to prevent the inadvertent releasing of the flange 44 from the front locking clip 46.

Looking now at FIG. 3, the lighting mechanism 20 contained within the capsule 16 is shown attached to the base 18. The mechanism 20 is constructed similarly to the arrangement disclosed in U.S. Pat. No. 5,060,121 and includes a tail light bulb 63 and a side marker bulb 64 mounted in sockets 65 that are connected to electric conductors 66, 67, and 68 to create an electric circuit able to carry an electric current from the vehicle electrical system to each of the light bulbs 63 and 64. The conductors 66, 67, and 68 are formed of thin, metal sheets and are mounted to the bosses 24 on the base 18. Upon the insertion of the light bulbs 64 into the sockets 65, the connection of the conductors 66, 67, and 68 to the electrical system of the vehicle will allow the light bulbs 64 to operate.

The arrangement by which the light capsule 16 is connected to the vehicle electrical system through the well 26 is illustrated in FIGS. 3 and 7–11. The well 26 is divided into two separate portions by a well ridge 69 extending across the width of the well 26. The ridge 69 divides the well 26 into a conductor portion 70 and a terminal portion 72. A set of conductor openings 74 extend through the base 18 and allow each conductor 66, 67, and 68 access to the well 26. Each conductor 66, 67, and 68 extends through one of the conductor openings 74, across the conductor portion 70, and into the terminal portion 72. The free end of each conductor 66, 67, and 68 defines a terminal 78.

The terminals 78 may be connected to the lead wires 80 of the electrical system of the vehicle in a variety of ways. First, as disclosed in the prior art sealed light capsule of U.S. Pat. 5,060,121, each of the terminals 78 may utilize a sleeve connector (not shown) to connect each lead wire 80 with a terminal 78. In this method, after the connection is made between the terminals 78 and the lead wires 80, the well 26 is filled with a thermosetting resin. The resin hardens upon curing, and serves to permanently retain the connection made between the terminals 78 with the lead wires 80.

In a second method, as illustrated in FIGS. 7–11, the terminal portion 72 can include a number of cup-shaped receptacles 84, each integrally formed with the well 26 and the terminal end 78 of each conductor 66, 67, 68 is located within a receptacle 84. Each receptacle 84 is spaced from other adjacent receptacles 84 to allow the connection of each terminals 78 with a specific receptacle 84 without interference from any other terminal 78. Furthermore, the tip of each terminal 78 includes an arcuate recess 92.

Figure 7:
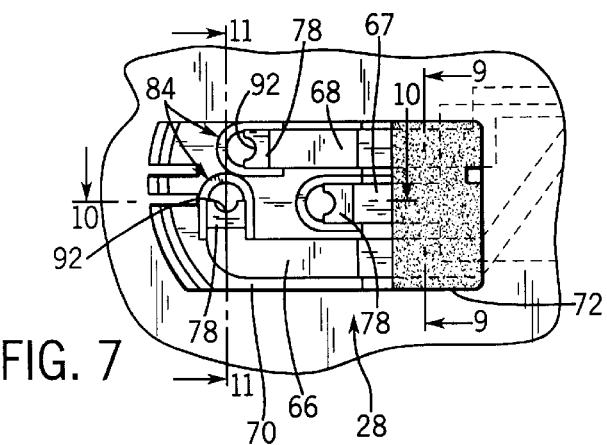
FIG. 7 is a cross-sectional view along line 7—7 of FIG. 3.
Figure 8:
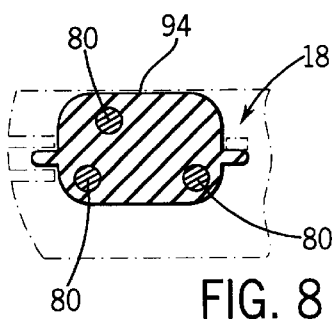
FIG. 8 is a cross-sectional view along line 8—8 of FIG. 3.
Figure 9:
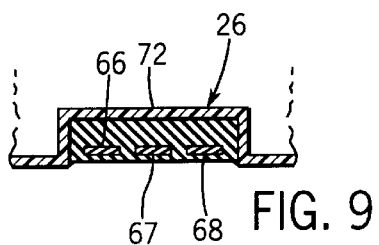
FIG. 9 is a cross-sectional view along line 9—9 of FIG. 7.

After connection of the terminals 78 to their respective receptacles 84, the terminals 78 are fixed in position within the well 26 by filling the conductor portion 70 of the well 26 with a thermosetting resin, as shown in FIGS. 7 and 9.

Figure 10:
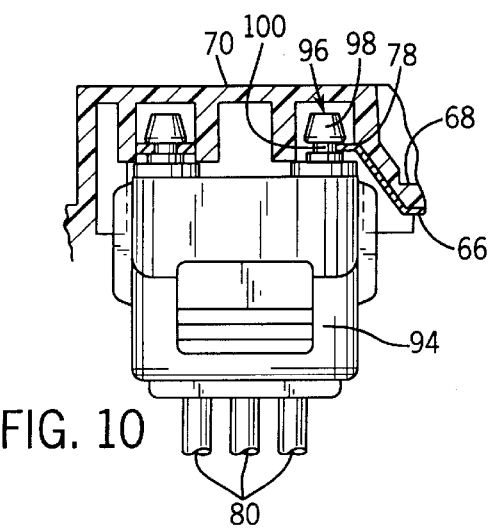
FIG. 10 is a cross-sectional view along line 10—10 of FIG. 7.

When the terminals 78 have been fixed in position by the resin, the light capsule 16 may be connected to the vehicle electrical system through the use of a plug 94, as illustrated in FIGS. 10–11. The plug 94 includes lead wires 80 that extend through the plug 94 and are connected to a set of prongs 96 located on the plug 94 opposite the lead wires 80.

The plug 94 is connected to the capsule 16 by mating each prong 96 with a receptacle 84. Each prong 96 consists of a tapered head 98 and a circumferential groove 100 located beneath the head 98. The prongs 96 are pressed into the receptacles 84 such that the tapered heads 98 contact and deflect the terminals 78 causing the indentations 92 of terminals 78 to engage grooves 100, thus providing a firm connection between prongs 96 and terminals 78.

The present invention has a number of advantages over prior art sealed light capsules. First, the present invention allows individual components of the capsule to be replaced whey they become inoperative, rather than having to replace the entire capsule. Furthermore, the construction of the capsule provides a positive, water-proof seal for the interior of the capsule, thus preventing water or moisture from entering the capsule. Finally, the present invention allows the capsule to be selectively connected to the vehicle's electrical system through the use of a plug and corresponding receptacles located on the capsule, greatly facilitating the mounting of the tail light assembly to the vehicle.

What is claimed is:

1. A tail light construction, comprising a housing having a rear wall to be connected to a vehicle, a sealed capsule disposed within the housing and including a base attached to said rear wall, said capsule including a lighting mechanism mounted on the base and a light source and electrical conducting means connected to the light source and extending in sealed relation through the base to the exterior, said capsule also including a light transmitting casing enclosing the light mechanism, latching means for removably connecting the peripheral edge portion of the casing to the base, sealing means for sealing the peripheral edge portion of the casing to the base, and release means for releasing said latching means to permit the casing to be removed from the base.

2. The tail light construction of claim 1, wherein said latching means comprises a first latch member on said base and a second latch member on said casing, one of said latch members being flexible and constructed and arranged to flex when contacted by the other latch member to effect latching engagement between the casing and the base.

3. The tail light construction of claim 2, wherein the first latch member comprises a flange projecting laterally from the casing and the second latch member comprises an arm projecting forwardly from the base, said arm being flexible in a direction toward and away from the flange.

4. The tail light construction of claim 3 wherein said release means comprises means for flexing said arm laterally away from the casing to effect release of said first latch member from said second latch member.

5. The tail light construction of claim 4 wherein said arm has an inclined cam surface disposed above said second latch member, said cam surface disposed to be engaged by the peripheral edge of the casing as the casing is mounted on the base to thereby flex the arm laterally outward and permit engagement of said latching members.

6. The tail light construction of claim 1, wherein said base is provided with a groove to complement and receive the peripheral edge of the casing, and said sealing means comprises a resilient sealing member mounted in the groove and disposed to be engaged by the peripheral edge portion of the casing.

7. The tail light construction of claim 6, wherein said groove is bordered by an outer wall and an inner wall and a bottom wall, a ledge is disposed on the inner wall and spaced from the bottom wall, and said sealing member is supported on said ledge and disposed to engage the inner surface of the casing.

8. The tail light construction of claim 7, wherein the inner surface of the casing adjacent the peripheral edge is inclined and disposed to engage and compress the sealing member.

9. A tail light construction comprising a housing having a rear wall to be connected to the vehicle and having an open portion, a lens enclosing said open portion, a base attached to said rear wall and having a forward surface and a rear surface, a lighting mechanism mounted on the forward surface of the base and including a light bulb and electrical conducting means connected to the light bulb and extending in sealed relation through the base to the exterior, a light transmitting casing enclosing the lighting mechanism and having a peripheral edge engaged with the base, said base having a groove to complement and receive the peripheral edge of the casing, a resilient sealing member disposed in the groove, the peripheral edge of the casing disposed in the groove and engaged with the sealing member to provide a seal between the casing and the base, a flange projecting laterally from the casing and spaced from the peripheral edge, a plurality of arms extending outwardly from the forward surface of the base and each arm having a latching element disposed to engage the flange to thereby secure the casing to the base, said arms being flexible in a direction away from said casing, and release means for manually flexing the arms in a direction away from the casing to thereby disengage said latching elements from the flange and permit removal of the casing from the base.

10. The tail light construction of claim 9, including an inclined cam surface disposed on each arm and spaced from the respective latching element, said cam surface being disposed to be engaged by the peripheral edge of the casing as the casing is mounted on the base to thereby flex the arms outwardly and effect engagement of the latching element with the flange on the casing.

11. A tail light construction for a vehicle, comprising a base, a light source mounted on the base, a first electrical connector connected to the light source and extending through an opening in a forward surface of the base and having an end portion defining a terminal, a receptacle disposed on a rear surface of the base, said terminal extending generally radially in said receptacle, a second electrical conductor connected to the electrical system of a vehicle and terminating in a prong, said prong being removably received within said receptacle and engaged with said terminal to effect an electrical connection between said first and second conductors.

12. The tail light construction of claim 11, wherein said receptacle has an open end and a bottom, said terminal being flexible and extending diagonally in a direction toward the bottom of the receptacle.

13. The tail light construction of claim 12, wherein said prong is provided with a circumferential groove to receive said terminal.

14. The tail light construction of claim 13, wherein the end of said terminal is provided with an arcuate recess to complement and engage the groove in said prongs.

15. The tail light construction of claim 12, wherein said prong is provided with a tapered outer head constructed and arranged to deflect said terminal when said prong is inserted in said receptacle.

16. The tail light construction of claim 11, wherein said construction includes a plurality of said receptacles disposed in side-by-side relation in a depression in the rear surface of the base, and said construction further includes a plurality of said prongs connected to a plug with each prong disposed to engage a corresponding receptacle.

* * * * *